United States Patent [19]
Alexander

[11] Patent Number: 6,082,952
[45] Date of Patent: Jul. 4, 2000

[54] AUTOMATIC WHEEL CHOCK SYSTEM

[75] Inventor: James C. Alexander, Ontario, Canada

[73] Assignee: United Dominion Ind., Inc., Charlotte, N.C.

[21] Appl. No.: 08/989,392

[22] Filed: Dec. 12, 1997

[51] Int. Cl.[7] .................................................. B65G 69/00
[52] U.S. Cl. ........................ 414/401; 414/396; 414/584; 188/32
[58] Field of Search .................................. 414/373, 401, 414/396, 584; 410/30; 188/32, 36, 4; 269/86, 87, 104

[56] References Cited

U.S. PATENT DOCUMENTS

| | | | |
|---|---|---|---|
| 2,661,505 | 12/1953 | Dilione | 20/1.12 |
| 3,305,049 | 2/1967 | Willey | 188/32 |
| 4,207,019 | 6/1980 | Cone | 414/373 |
| 4,264,259 | 4/1981 | Hipp | 414/401 |
| 4,443,150 | 4/1984 | Hahn et al. | 414/401 |
| 4,969,792 | 11/1990 | Ellis et al. | 414/401 |
| 5,120,181 | 6/1992 | Alexander | 414/401 |
| 5,249,905 | 10/1993 | Warner et al. | 414/401 |
| 5,259,718 | 11/1993 | Alexander | 414/401 |
| 5,375,965 | 12/1994 | Springer et al. | |
| 5,553,987 | 9/1996 | Ellis | 414/401 |
| 5,582,498 | 12/1996 | Springer et al. | 414/401 |
| 5,709,518 | 1/1998 | Alexander et al. | 414/401 |
| 5,743,697 | 4/1998 | Alexander | 414/401 |
| 5,762,459 | 6/1998 | Springer et al. | 414/401 |
| 5,896,957 | 4/1999 | Berends et al. | 414/401 X |

OTHER PUBLICATIONS

Pentalift drawing.
Combar brochure.
Kelley Auto Chock Truck Restraint.

*Primary Examiner*—Frank E. Werner
*Attorney, Agent, or Firm*—Sughrue, Mion, Zinn, Macpeak & Seas, PLLC

[57] ABSTRACT

An automatic vehicle chock has a chock and a locking mechanism movable on a rail from a retracted position to a position where the chock is extended and held in position by the locking mechanism. A sensor moves with the chock to determine the position of the wheel to be chocked and extend the chock. The position of the sensor relative to the chock can be adjusted. The device also employs mechanical assemblies carried by the carriage assembly to retract the chock without the use of a brake. In one embodiment a cam is used to reverse the direction of the chock arm retaining spring after the chock has been engaged. In a second embodiment the chock is continuously biased to the stored position and a latch is used to hold the chock outward until it is locaked in posiion. The latch is then released and the bias to the stored position is restored so that the chock will retract when the lock is released.

21 Claims, 14 Drawing Sheets

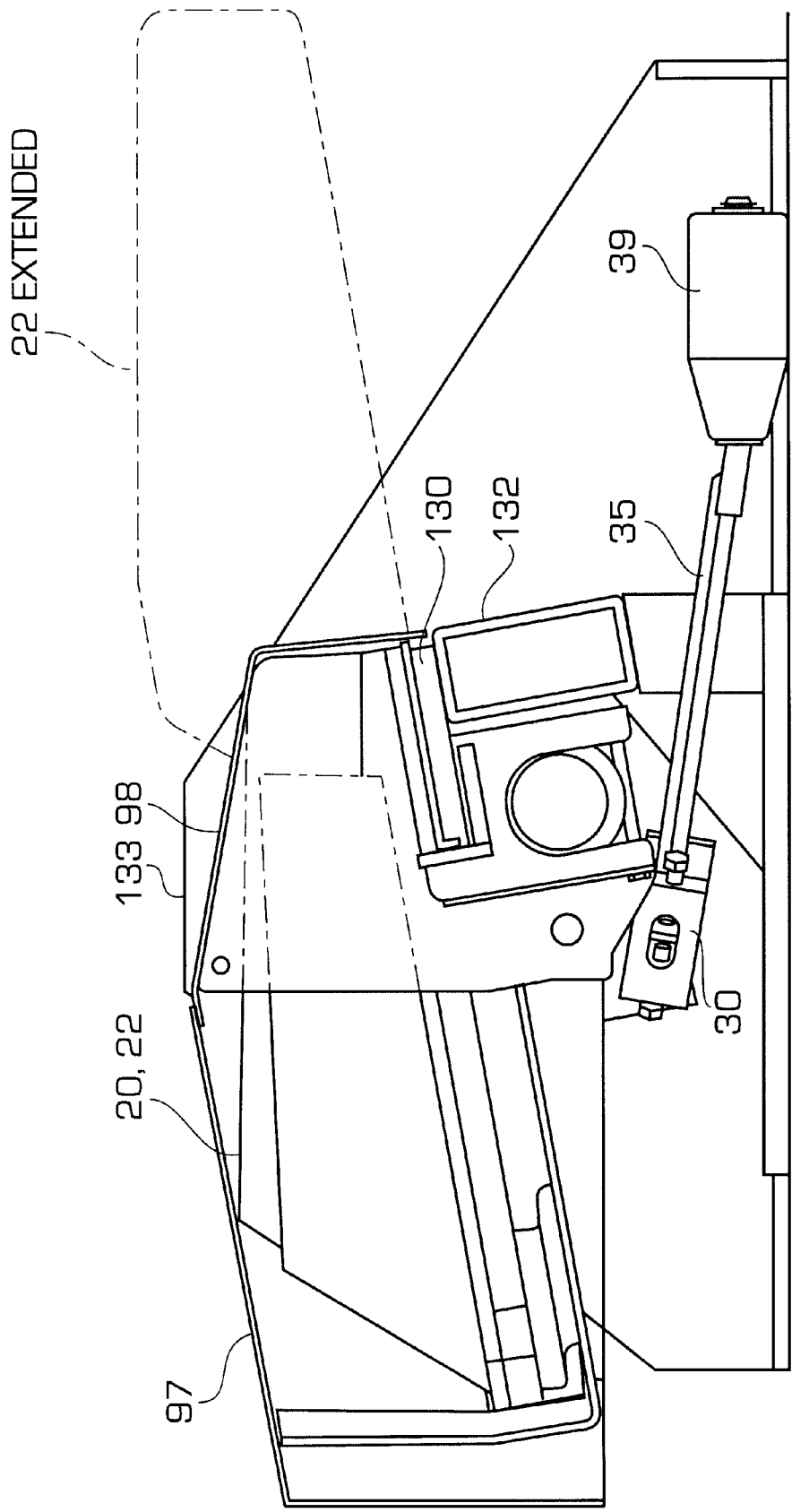

6,082,952

AUTOMATIC WHEEL CHOCK SYSTEM

BACKGROUND OF THE INVENTION

A. Field of the Invention

This invention is related to loading dock equipment and in particular to devices that restrain vehicles at loading docks.

B. Prior Art

This invention is an improvement a commonly assigned and co-pending application Ser. No. 08/679,719 filed on Nov. 24, 1994, now U.S. Pat. No. 5,743,697 and entitled "Automatic wheel Chock". The subject matter of that patent application is expressly incorporated by reference. That invention represents a basic improvement in vehicle restraints that chock wheels as opposed to engaging and by hooking or blocking the ICC bar prevent movement of the vehicle. Specifically this invention improves performance of the brake to eliminat the potential for inconsistent operation. Variations caused by wear and humidity may result in the chock not always retracting from the wheel. This invention relates to two systems to provide a positive force to retract the chock without the use of a brake.

SUMMARY OF INVENTION

It is an object of this invention to provide a vehicle chocking device having an improved mechanism to retract the chock without the uses of a brake.

In accordance with this object of the invention, an improved vehicle chocking device having a chock mounted on a carriage for movement proximate to the wheel to be chocked employs a cam to reverse the direction of the chock armspring after the chock has been engaged. A second technique continuously biases the chock toward the retracted position and employs a latch to hold the chock in the extended position until it has been locked. The latch is sbsequently released so that the chock will retract when the lock releases the chock.

It is another object of this invention to provide an improved technique to adjust the position of the sensing roller to accomodate for situations where the axles on trucks are placed close together.

In accoradance with this object of the invention, the sensing roller position may be varied relative to the position of the chock so that the position of the chock vis-a-vis the tire it is to engage can be optimized to avoid striking either the side of that tire or the tire which is positioned forward to the wheeel to the chocked. The automatic vehicle chock of this invention has a chock and a locking mechanism movable on a rail from a retracted position to a position where the chock is extended and held in position by the locking mechanism. A sensor moves with the chock to determine the position of the wheel to be chocked and extend the chock. As mentioned, the position of the sensor relative to the chock can be adjusted. The devive also employs mechanical assemblies carried by the carriage assembly to retract the chock without the use of a brake. In one embodiment a cam is used to reverse the direction of the chock arm retaining spring after the chock has been engaged. In a second embodiment the chock is continuously biased to the stored position and a latch is used to hold the chock outward until it is locaked in posiion. The latch is then released and the bias to the stored position is restored so that the chock will retract when the lock is released.

These and other aspects of this invention will be described in greater detail by reference to the attached drawing and the description of the preferred embodiments that follows.

BRIEF DESCRIPTION OF THE DRAWING

FIG. 17 is an end view illustrating the canted rail modification of this invention.

DESCRIPTION OF THE FIRST PREFERRED EMBODIMENTS

Figure 1:
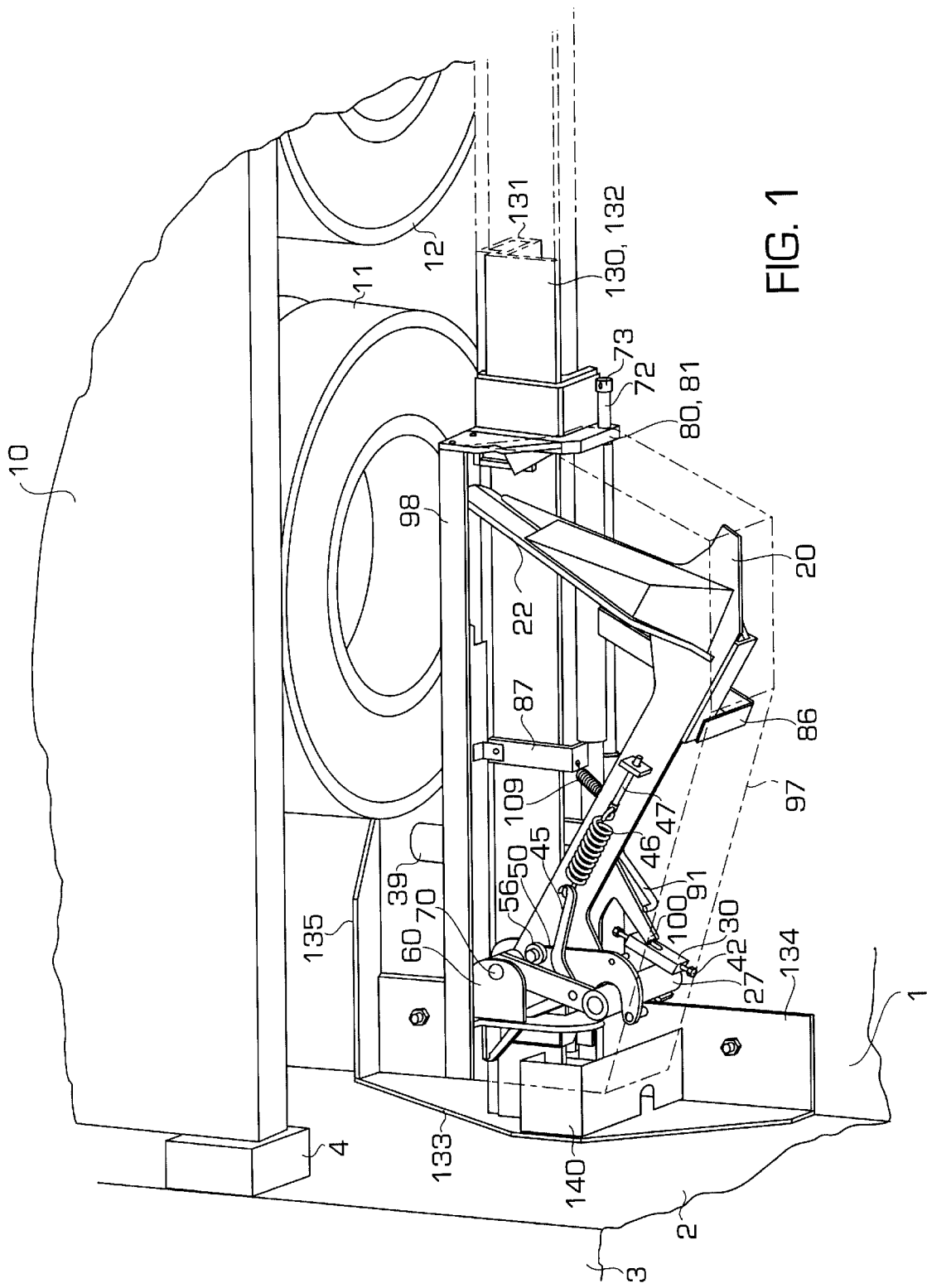
FIG. 1 is a perspective view, partially cut-away, of the first preferred embodiment of this invention illustrating the wheel chock in a retracted position.

Referring first to FIG. 1, a perspective of a typical loading dock is depicted which has a driveway surface 1, a dock face 2, a dock floor 3 and dock bumpers 4 which limit the position of the transport vehicle 10 and protect the dock wall from impact damage. The vehicle 10 is shown for purposes of illustration with two separated axles having wheels 11 and 12, as typically found on a semi-trailer. It will be understood that the utilization of this invention is not in any way restricted by the wheel/axle configuration of the vehicle to be retained. Thus, the phrase "separated axles" means any two axles on the vehicle. It covers the closely spaced axles on the rear of a semi-trailer equally as separated axles on a two-axle vehicle.

Figure 2:
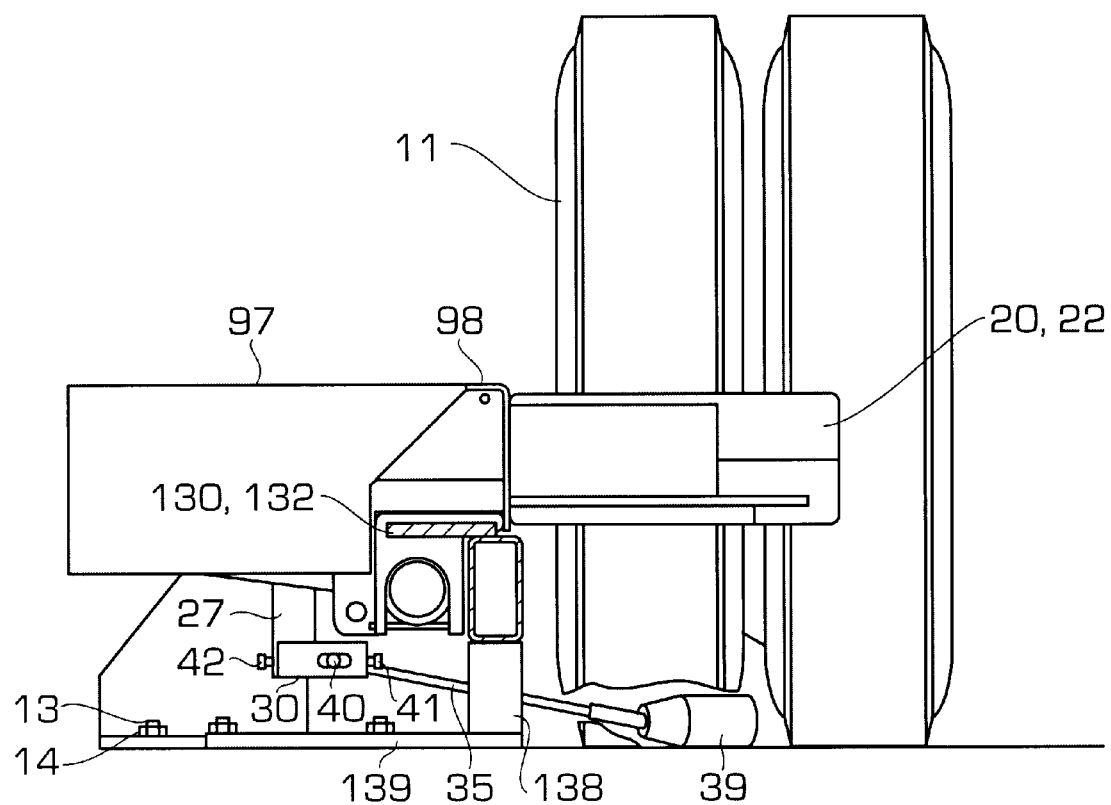
FIG. 2 is a front view of the first preferred embodiment illustrating the chock engaging the wheels of a transport vehicle.

As illustrated in FIGS. 1 and 2, an automatic chocking device in accordance with this invention is illustrated with the chock retracted in the stored position. A rail assembly 130 has a structural tube 131 and a guide rail 132. The rear end of the rail assembly is attached to a back plate 133 and base plate 134 which is fastened to the driveway surface 1 with anchor bolts 13 and nuts 14. Alternately it may be welded to a steel plate which has been embedded in the concrete of the driveway. The technique of affixation is not critical to this invention so long as the guide rail is secured.

The guide rail 132 is illustrated with a horizontal top surface. In installations where snow or ice buildup are factors the rail may be canted at an angle, for example 10 degrees to facilitatewater run off and thus preclude ice or snow bulidup. The rail may also be heated. This modification is illustrated in FIG. 17. In that figure the extension of the chock is illustrated in the chained line.

A carriage assembly 60 and a lock assembly 80 are carried on the rail assembly 130. A chock assembly 20 is attached to the carriage assembly 60 by the pin 70. These components are shown in greater detail in FIGS. 3, 4, and 5.

FIG. 2 illustrates a front view, i.e. looking in toward the loading dock, of the guide rail assembly 130. The front end of the rail assembly is supported on a post 138 mounted on a plate 139 which is shown attached to the surface of the driveway by anchor bolts 13 and nuts 14. The chock 22 is shown in FIG. 2 in the extended position. The wheel 11 is partially cut away to illustrate the sensing roller 39 which would be on the opposite side of the wheel (see FIG. 1).

Figure 3:
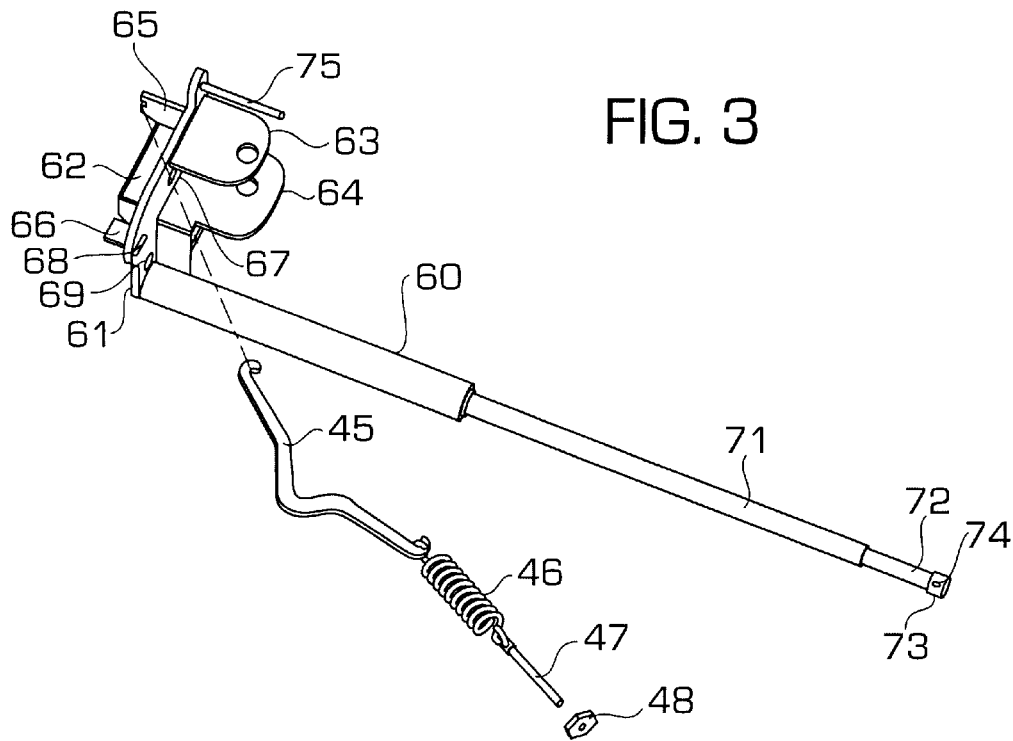
FIG. 3 is a detailed perspective view of the first preferred embodiment illustrating the carriage assembly and related components.

FIG. 3 illustrates the carriage assembly 60. A plate 61 is shaped to fit freely around the guide rail 132 (see FIG. 2). A plate 62 carries a low friction bearing plate (not shown) to reduce friction when sliding along the track. Two mounting lugs 63 and 64 attached to the plate 61 each have a vertical hole which carries the hinge pin 70 to mount the chock assembly 20. The plate 61 also has a spring anchor plate 65, a limit switch target plate 66, and holes 67, 68 and 69. A guide bar assembly 71 carries a shaft 72. A collar 73 is attached to the shaft by a pin 74.

As shown in FIG. 1, a cam bar 45 has one end inserted through the hole 67 and is hooked over the end of the plate 65 of the carriage assembly 60. The other end of the bar is attached to a spring 46 and an adjusting bolt 47 is secured to a mounting lug 32 on the chock assembly 20 by a nut 48.

Figure 4:
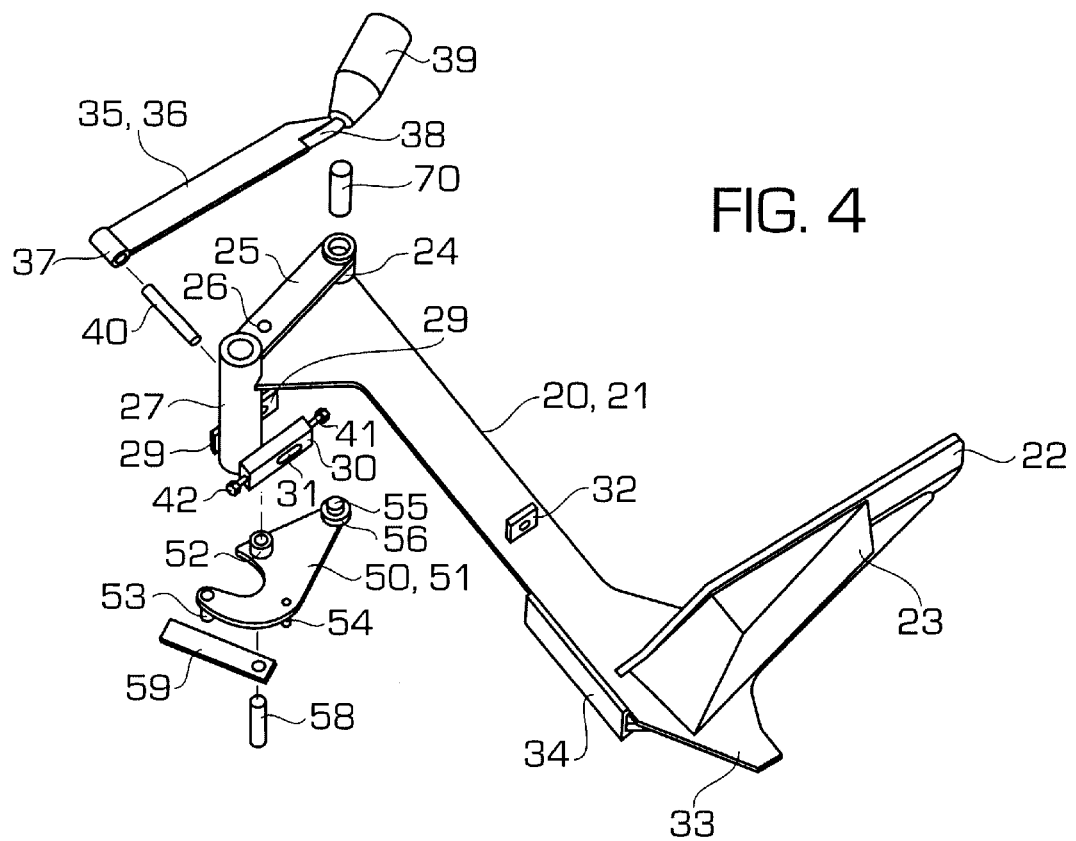
FIG. 4 is a detailed perspective view of the first preferred embodiment illustrating the chock assembly and related components.

FIG. 4 illustrates the chock assembly 20 with an arm 21. One end of the arm 21 has a chock plate 22, supported by a gusset 23, which contacts the front of the wheel 11. The other end of the arm has a pivot tube 24, a control arm 25 with a hole 26, and a vertical torque arm 27 which carries two support plates 28 and 30. The plate 28 has a hole 29, and the plate 30 has a slotted hole 31 and two threaded holes which carry the bolts 41 and 42. The chock arm 21 also has a spring anchor lug 32, wedge-shaped locking surface 33 and a support angle 34. A sensing arm assembly 35, comprising a lever arm 36, pivot bushing 37, axle 38 and roller 39, is mounted to the plates 29 and 31 by a pin 40, which is in turn secured in the slotted hole 31 by the bolts 41 and 42. A lever assembly 50 has a plate 51, pivot bushing 52, pins 53 and 54 extending below the plate, and pin 55 extending above the plate. A roller 56 is mounted on pin 55. A pin 58 mounted through the hole 26 in the chock assembly 20 carries the lever assembly 50 and a limit switch target bar 59.

Figure 5:
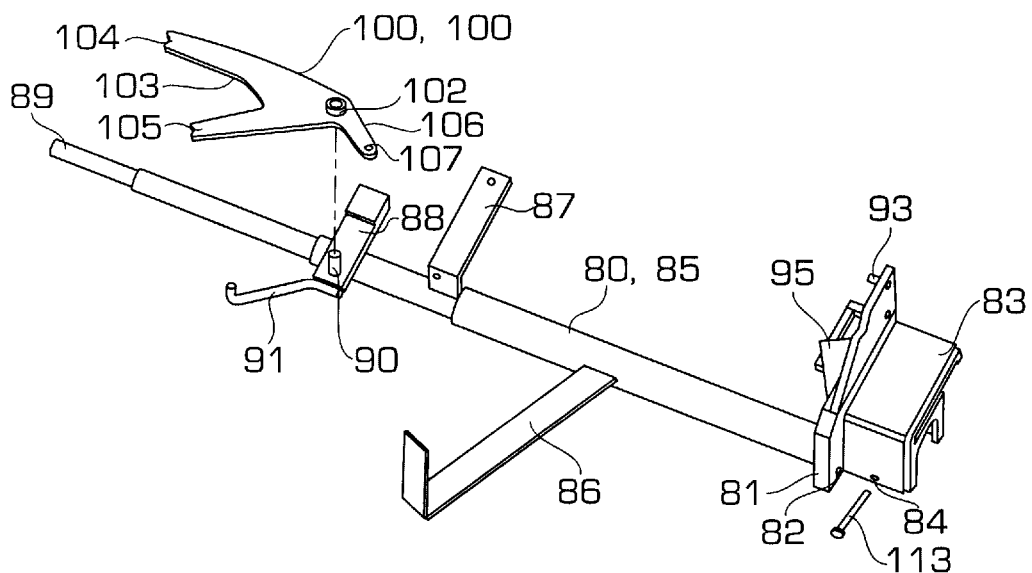
FIG. 5 is a detailed perspective view of the first preferred embodiment illustrating the lock assembly and related components.

FIG. 5 illustrates the lock assembly 80. A plate 81 has a hole 82 and carries a housing 83 which is shaped to fit freely around the guide rail 132 (see FIG. 2). A hole 84 passes through the lower part of the housing 83 to accept a pin 113 which secures the hydraulic cylinder assembly 110 to the lock assembly 80. A wedge shaped locking surface 95 projects rearward from the plate 81. The housing 83 has low friction bearing plates (not shown) fitted into internal recesses of the housing in a manner similar to those in the carriage assembly 60. A guide bar 85 is attached to the plate 81 and carries a support bar 86, a bracket 87, a bar 88 and a shaft 89. The bar 88 has a pin 90 and a stop bar 91. A plate assembly 100 has a plate 101 and a pivot bushing 102. The plate has a cam surface 103, two concave points 104 and 105, and a lever 106 with a hole 107. The plate assembly 100 is carried on the pin 90 on the lock assembly 80 and is urged counter clockwise against the stop bar 91 by the spring 109 which has one end attached through the hole 107 and the other end attached to the bracket 87 as shown on FIG. 1.

Figure 6:
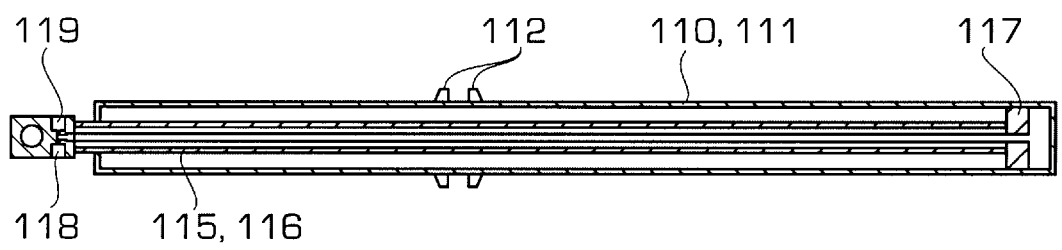
FIG. 6 is sectional view of a hydraulic cylinder.

FIG. 6 illustrates the double acting hydraulic cylinder assembly 110 with a cylinder barrel 111 and mounting rings 112 which fit into the housing assembly 83 of the lock assembly 80. A rod assembly 115 has a rod 116 and a piston 117. The rod assembly is anchored by a pin 114 (see FIG. 9) through the hole in the end of the rod 116 to mounting lugs 137 attached to the under side of the guide rail 132 support assembly 133 of the rail assembly 130. The ports 118 and 119 are placed in the end of the rod 116 to eliminate external pipes/hoses which would otherwise be required to both ends of a conventional cylinder. Fluid is carried to the cylinder from the ports through hollow passages in the cylinder rod. Thus the cylinder barrel 111 will move without any hoses being exposed.

When hydraulic fluid is pumped in through the port 118, the pressure on the front side of the piston 117 causes the cylinder barrel 111 and lock assembly 80 to extend away from the dock wall 2. When hydraulic fluid is pumped in through the port 119, the pressure on the rear side of the piston causes the cylinder barrel and the lock assembly to retract toward the wall.

The relationship of the components thus far discussed is shown in FIGS. 1, 2, 7, 8 and 9. The carriage assembly 60 and the lock assembly 80 are mounted on the guide rail 132, as illustrated in FIG. 1. The shaft 89 of the lock assembly 80 fits into the hole 69 of the plate 61 of the carriage assembly 60 and the shaft 72 fits into the hole 82 in the plate 81 of the lock assembly 80. Thus, the carriage assembly 60 and the lock assembly 80 are provided with resistance against lateral motion by the guide rail 132 and are provided resistance against twisting motion by engagement with each other. The lock assembly 80 has freedom of axial motion relative to carriage assembly 60 limited by the plate 81 of the lock assembly 80 being trapped between two shoulders on the shaft 68 formed by the bar 71 and the collar 73.

The chock assembly 20 is mounted between the lugs 63 and 64 of the carriage assembly 60 and pivots on a pin 70. The sensing roller assembly 35 is attached to the chock assembly by the pin 40. The roller 39 rests on the driveway and is free to pivot up and down with variations in the driveway surface. The pin 40 is secured in the slotted hole 31 by the bolts 41 and 42, which are also used to adjust the angular position of the sensing arm assembly 35 relative to the chock arm assembly 20. For example, turning the bolt 41 outward and the bolt 42 inward will cause the sensing arm to rotate clockwise and bring the roller 39 closer to the chock plate 22 to compensate for differences is wheel size. Preferably the actuating mechanism is enclosed by a cover assembly 97 illustrated as phantom lines. The forward end of the cover assembly is attached to the lock assembly 80 by pin 93, and the rear end of the cover assembly is guided by the pin 75 of the carriage assembly 60. The cover assembly 97 protects the mechanism from the elements and also protects personnel from contact with moving parts. The cover assembly can be hinged upward to allow access for maintenance. A stationary shield 48 is fastened to bracket 87 and plate 81 of the lock assembly 80.

In operation, when a transport vehicle 10 is not restrained, the chock assembly 20 is retracted within the shield assembly 97 as shown on FIG. 1. The carriage assembly 60 is positioned at the rear of the guide rail assembly 130 near the dock wall 2. A guard plate 135 attached to the plate 134 of the guide rail assembly 130 protects the sensing roller 39 from impact with lowered tail gates or snow plows when in the stored position. When a vehicle 10 being backed up to the dock is not properly positioned to the dock, the outer rear wheel 11 will be guided by the upright surface of the tube 131 of the rail assembly 130. That is, the tube 131 tends to guide the vehicle so that it is pre-positioned relative to the chock mechanism (see FIG. 2). When the chock device is actuated, hydraulic fluid is pumped from a hydraulic power unit (not shown) to the port 118 on the cylinder rod assembly 115 and this causes the hydraulic cylinder 110 and the lock assembly 80 to be pushed forward away from the dock wall 2.

Figure 7:
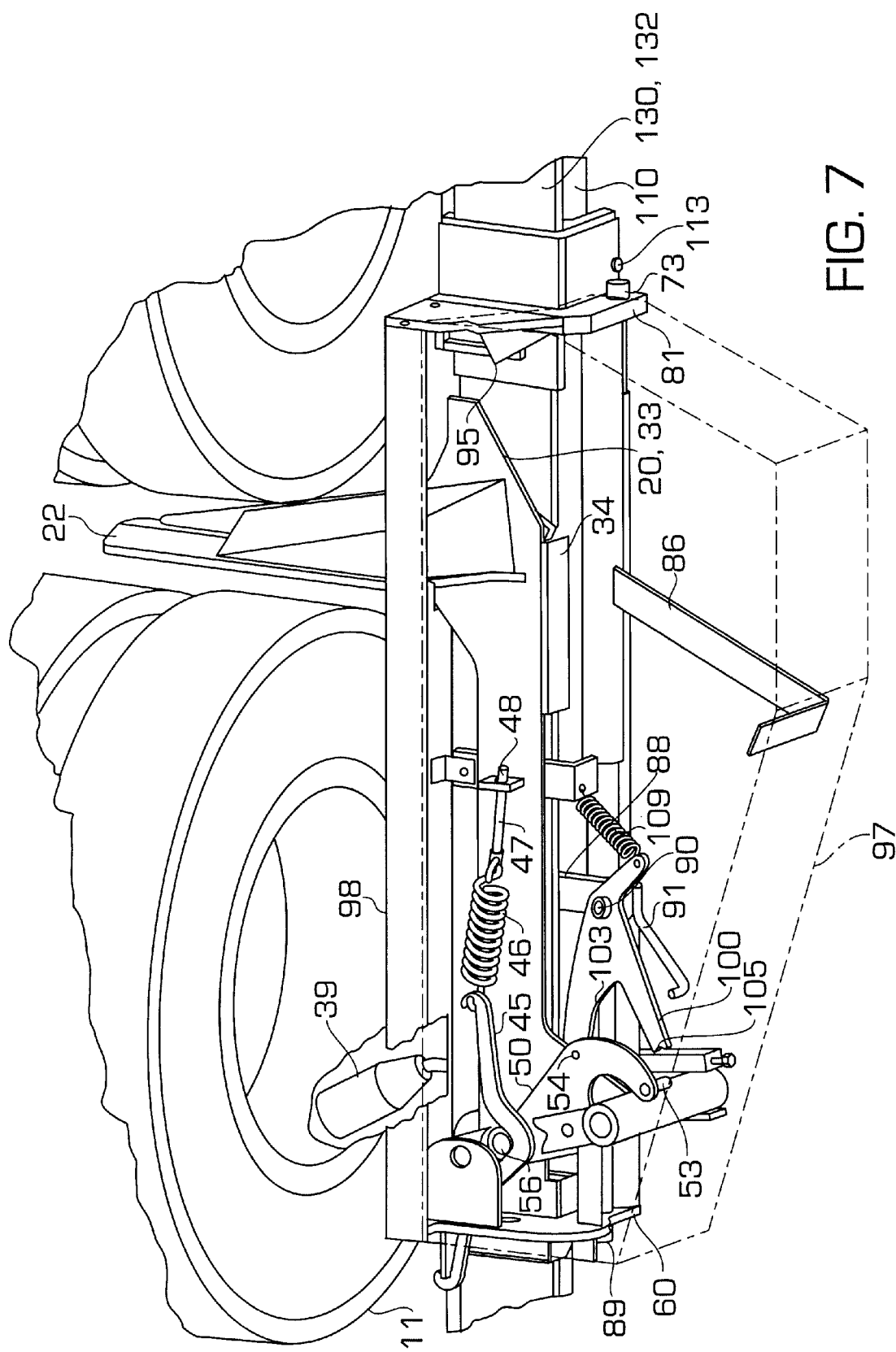
FIG. 7 is a perspective view, partially cut-away, of the first preferred embodiment of this invention illustrating the wheel chock in a partially engaged position.

As the cylinder 110 extends, the plate 81 of the lock assembly 80 contacts the collar 73 on the carriage assembly 60 and causes the carriage assembly 60 to move forward. As the carriage assembly continues to move forward, that is away from the loading dock, the sensing roller 39 contacts the rear of the wheel 11 as shown in FIG. 7. The small diameter of the roller 39 allows it to pass under a mud flap or a lowered hydraulic tail gate to contact the rear of the wheel 11. The vertical freedom of movement of the roller assembly allows the roller to contact the driveway and the wheel 11 with minimal vertical force transferred to the chock assembly 20. A fixed sensor bar contacting the wheel at such a low height would generate a vertical force greater than the horizontal force and might create a twisting force which prevents the chock assembly from pivoting freely.

As the cylinder 110 continues to extend, the horizontal force on the roller 39 causes the chock assembly 20 to rotate counterclockwise and extend the chock plate 22 in front of the outer rear wheel as shown in FIGS. 2 and 7. The spring 46 acts on the chock assembly to urge it toward the retracted position. Thus the force on the sensing roller 39 must overcome the force of the spring 46 before the chock assembly will rotate to the extended position and the chock will not be extended prematurely by debris on the driveway. When the chock is fully extended the sensing roller 39 is forced against the back of the tire and the carriage assembly 60 and lock assembly 80 will be prevented from moving farther away. As the chock arm rotates to the extended position the line of force of the spring 46 moves inside the pin 70 and the spring now urges the chock assembly to remain in the extended position as shown on FIG. 7. As the chock rotates toward the extended position, the cam bar 45 is forced against the roller 56 of the lever assembly 50, and the roller is forced into the concave recess of the cam bar. The lever assembly 50 is forced to rotate counter clockwise and the pin 54 on the lever assembly contacts the cam surface 103 on the plate assembly 100, causing the plate assembly 100 to rotate clockwise away from the stop bar 91 and align the recessed point 105 with the pin 53 on the lever assembly 50. Because the lock assembly cannot move farther out, the hydraulic pressure in the cylinder will increase and will be sensed by an electrical pressure switch or by a spring sequence valve (not shown), both of which are well known in the loading dock industry. The power unit will then direct hydraulic fluid through the port 119 to the rod side of the cylinder 110 and cause the cylinder to retract. The lock assembly 80 will then move rearward toward the dock. The locking surface 95 of the lock assembly 80 will engage the locking surface 33 of the chock assembly 20 and the chock assembly will be locked in the extended position as shown on FIG. 8. The lower flange of the angle 34 will extend under the guide rail 132 to provide additional support for the chock assembly 20.

Figure 8:
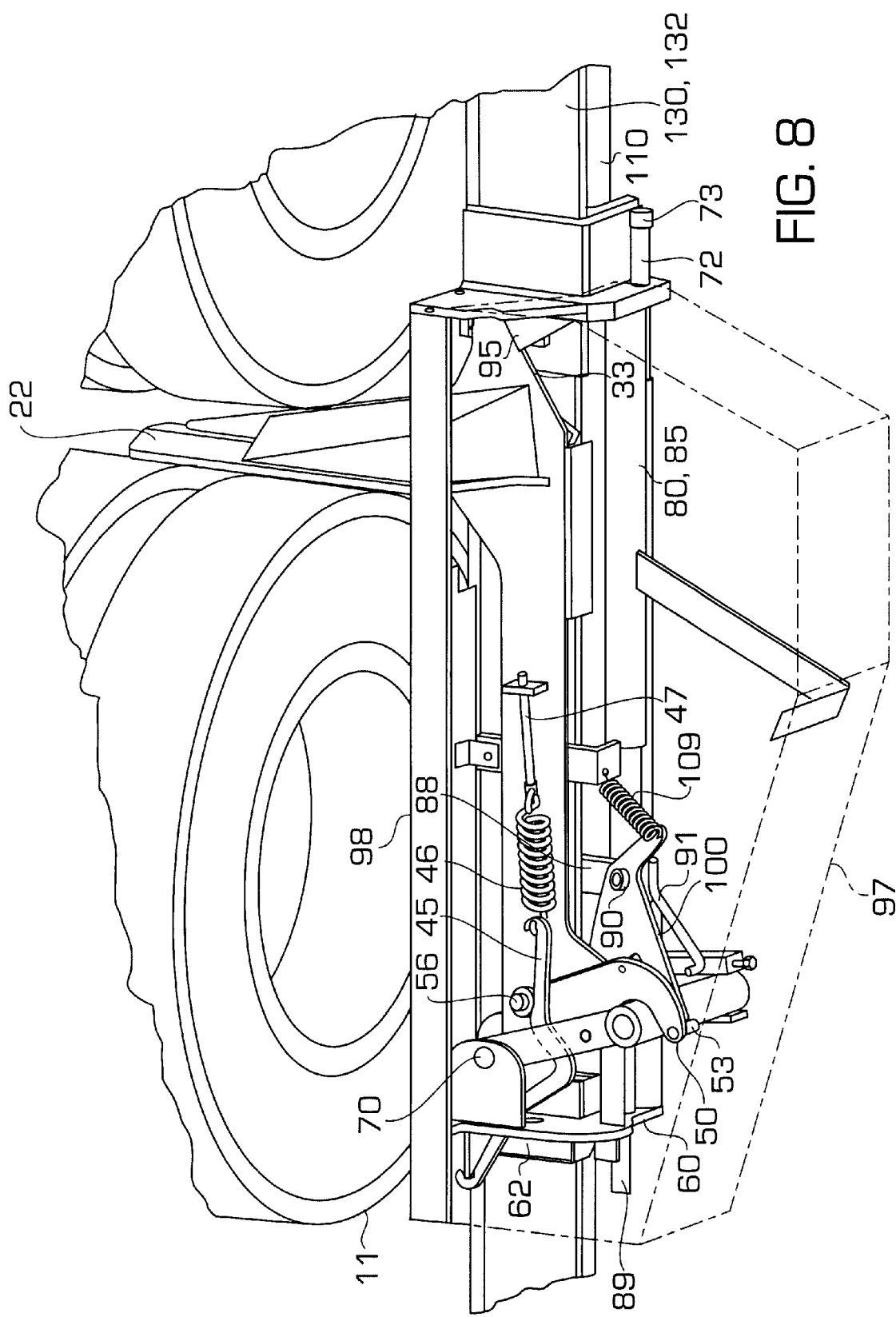
FIG. 8 is a perspective view, partially cut-away, of the first preferred embodiment of this invention illustrating the wheel chock in an engaged and locked position.

FIG. 8 illustrates the chock plate 22 engaging the front of the wheel 11. As the lock assembly 80 moved rearward towards the carriage assembly 60, the recessed point 105 of the plate assembly engaged the pin 53 of the lever assembly 50 causing it to rotate clockwise. The roller 56 was forced along the surface of the cam bar 45 and caused the spring 46 to be pulled away from the pivot pin 70. The spring will now urge the chock assembly to rotate clockwise toward the retracted position because the line of force is now outside the pin 70, but the locking surface 95 of the lock assembly 80 engaging the locking surface 33 of the chock assembly 20 will hold the chock in the extended position as shown in FIG. 8.

Figure 9:
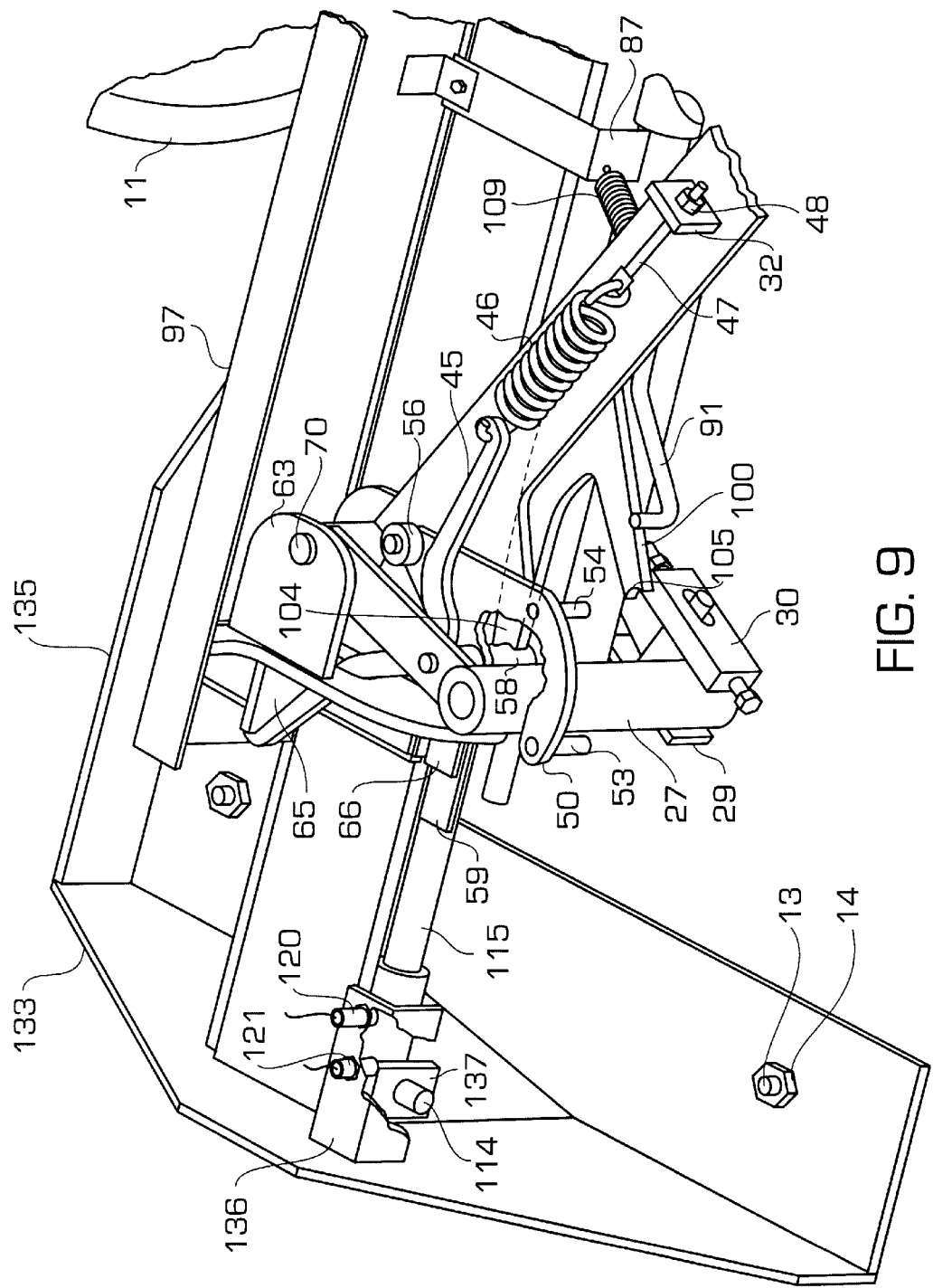
FIG. 9 is a perspective view, partially cut-away, of the first preferred embodiment of this invention illustrating the wheel chock as it moves toward the stored position.

When the loading operation is completed and the vehicle is to be released, the hydraulic cylinder 110 will extend. As the lock assembly 80 moves forward away from the carriage assembly, the cam surface 103 of the plate assembly 100 will moved out of contact with the pin 58 and the spring 109 will cause the plate assembly to rotate counterclockwise against the stop bar 91 and the recessed point 104 will align with the pin 58 (see FIG. 9). The lock assembly 80 will move the carriage assembly 60 forward until the sensing roller 39 again contacts the rear of the wheel 11 and the pressure switch will then cause a valve to shift. The power unit will then direct hydraulic fluid through the port 119 to the rod side of the cylinder 111 and cause the cylinder 110 to retract. The lock assembly 80 will then move rearward toward the dock as shown in FIG. 9. The concave point 104 of the plate assembly will engage the pin 58 on the chock assembly, preventing the lock assembly 80 from moving closer to the carriage assembly until the chock assembly has rotated inward to prevent the locking surface 95 from engaging the locking surface 33 of the chock 20. The spring 46 will urge the chock assembly 20 toward the retracted position as the lock assembly 80 forces the carriage assembly to move along the rail toward the wall.

As illustrated in FIG. 9, when the carriage assembly 60 has moved fully rearward along the rail, a limit switch 120 mounted to a bracket 136 on the rail assembly 130 will sense the target plate 66 on the carriage assembly 60 and cause the power unit to stop with the carriage assembly in the stored position. If the switch should malfunction, the pressure switch will sense the increase in hydraulic pressure and then cause the power unit to stop. A second switch 121 will sense the target bar 59 to indicate that the chock assembly 20 is rotated to the fully retracted position. The limit switches are protected by a cover 140 attached to the bracket 136.

In a configuration where the rail 132 is canted the rotation of the chock 22 will result in a difference of elevation from the stored position to the engaged position. In the extended position, the chock will be higher than in the position where it is stored in the housing 97. This has the preferable benefit of lowering the retracted position of the chock, and also the housing, to prevent impact with any structural components of the vehicle that may extend outside the wheel base. It also results in having the chock engage the tire at a higher position closer to the axle of the vehicle.

Figure 10:
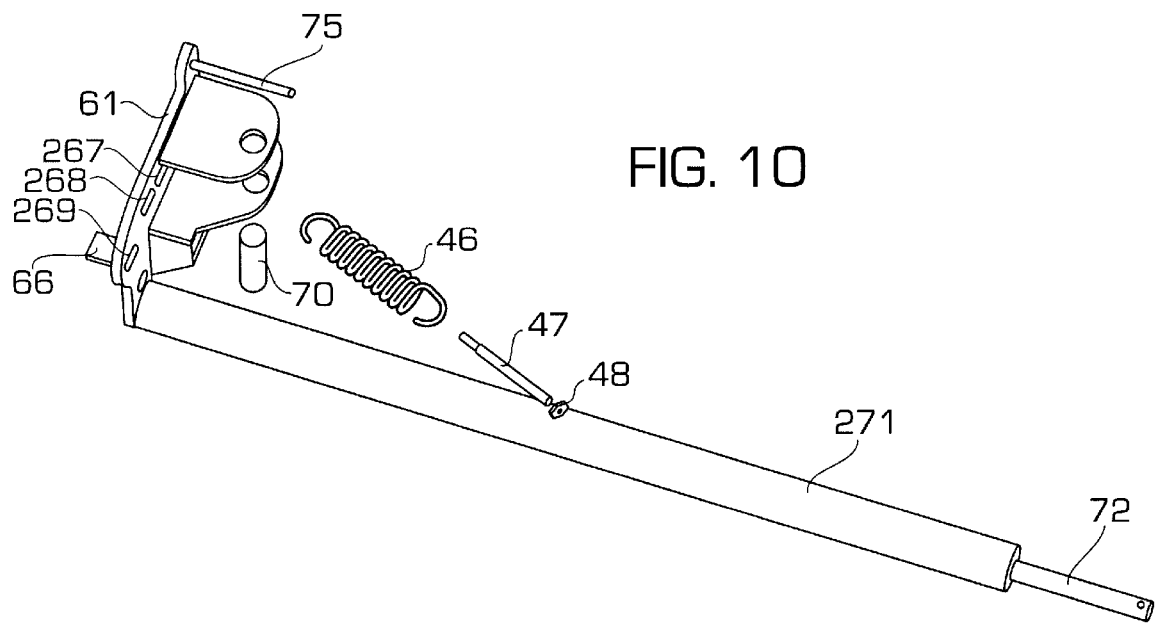
FIG. 10 is a detailed perspective view, illustrating the components of the second preferred embodiment of the carriage assembly.

The second preferred embodiment of the automatic chocking device is similar to the first preferred embodiment except for the technique of holding the chock in the extended position. Parts which are identical have been given the same numbers. In FIGS. 13, 14, 15 and 16 the chocking device is shown partially cut away to reveal the internal components. FIG. 10 illustrates the carriage assembly 260. A plate 61 is shaped to fit freely around the guide rail 132 of the guide rail assembly 130 (see FIG. 5). A plate 62 carries low friction bearing plates (not shown) to reduce friction when sliding along the guide rail. Two mounting lugs 63 and 64, attached to the plate 61, each have a vertical hole for mounting the chock assembly 220. The plate 61 also has a limit switch target plate 66, holes 267, 268 and 269, and a hinge pin 75. A guide bar 271 carries a shaft 72. A collar 73 is attached to the shaft by a pin 74. A spring 46 has one end inserted through the holes 267 and 268. The other end of the spring is attached to an adjusting bolt 47 secured to a lug 32 on the chock assembly 220 by a nut 48.

Figure 11:
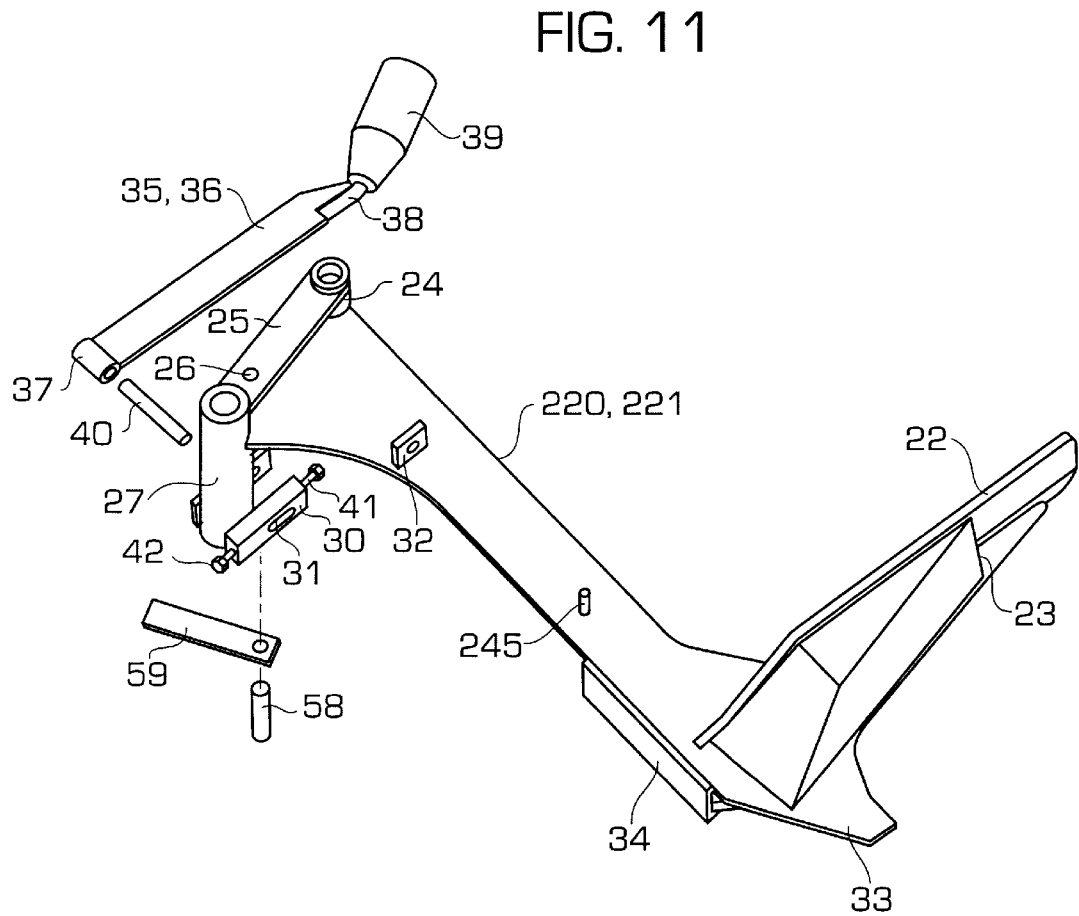
FIG. 11 is a detailed perspective view, illustrating the second preferred embodiment of the components of the chock assembly.

FIG. 11 illustrates the chock assembly 220 with an arm 221. One end of the arm 221 has chock plate 22, supported by a gusset 23, which contacts the front of the wheel 11. The other end of the arm has a pivot tube 24, a control arm 25 with a hole 26, and a vertical torque arm 27 which carries two support plates 28 and 30. A pin 58 is mounted through the hole 26 in the chock assembly 220. The plate 28 has a hole 29, and the plate 30 has a slotted hole 31 and two threaded holes which carry the bolts 41 and 42. The chock arm 221 also has a lug 32, wedge-shaped locking surface 33, a support angle 34, and a pin 245 projecting down from the lower surface. A sensing arm assembly 35 comprising a lever arm 36, pivot bushing 37, axle 38 and roller 39, is mounted to the plates 29 and 31 by a pin 40, which is secured in the slotted hole 31 by the bolts 41 and 42.

Figure 12:
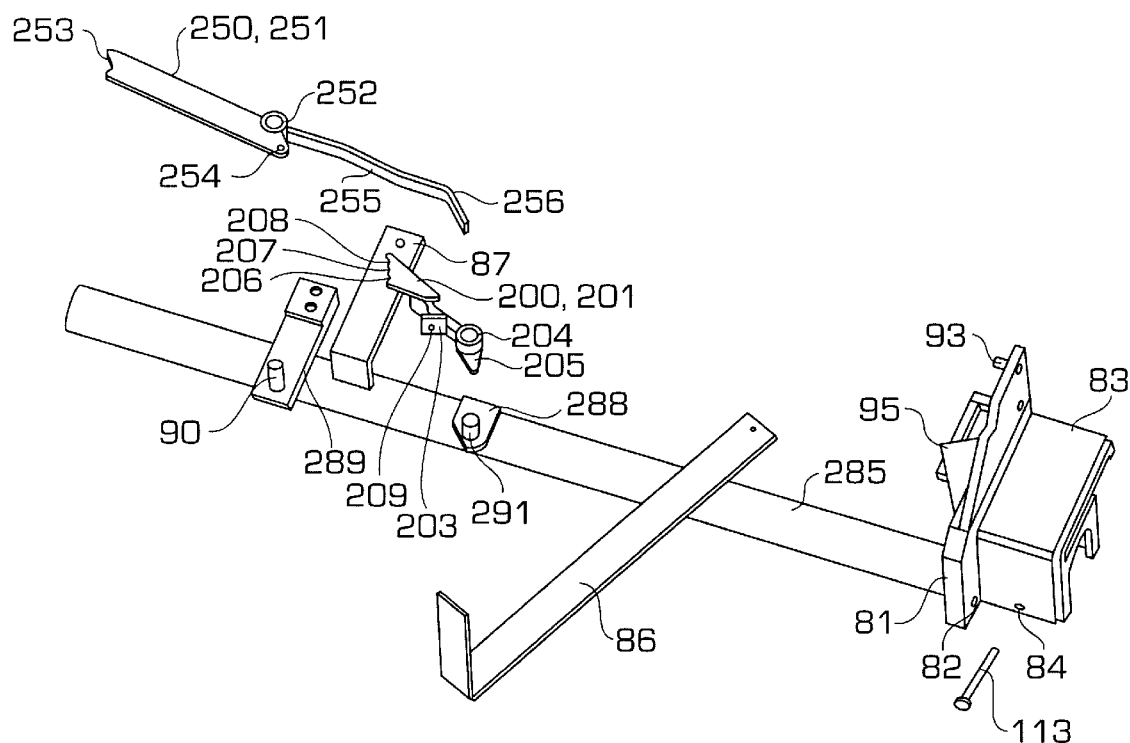
FIG. 12 is a detailed perspective view, illustrating the second preferred embodiment of the components of the lock assembly.

FIG. 12 illustrates the lock assembly. A plate 81 has a hole 82 and carries a housing 83 which is shaped to fit freely around the guide rail 132 (see FIG. 5). A hole 84 passes through the lower part of the housing 43. A locking cam surface 95 projects rearward from the plate 81. The housing 83 has low friction bearing plates fitted into internal recesses of the housing in a manner similar to those in the carriage assembly 60. A guide tube 285 is attached to the plate 81 and carries a support bar 86, a bracket 87 and bars 288 and 289. The bars 288 and 289 have pins 90 and 291.

A lever assembly 250 has a bar 251 attached to a pivot bushing 252. The bar has a concave surface 253 at the outer end and a hole 254 at the inner end. A lever 255 is attached to the bushing 252 and has a cam surface 256 at the outer end. The lever assembly 250 is carried on the pin 291 on the lock assembly 280. A latch assembly 200 has a latch plate 201, a bar 202, a plate 203, a pivot bushing 204 and a cam lobe 205. The plate 201 has multiple latch surfaces 206, 207 and 208. The plate 203 has a hole 209. The latch assembly 200 is carried on the pin 291 on the lock assembly 280.

Figure 13:
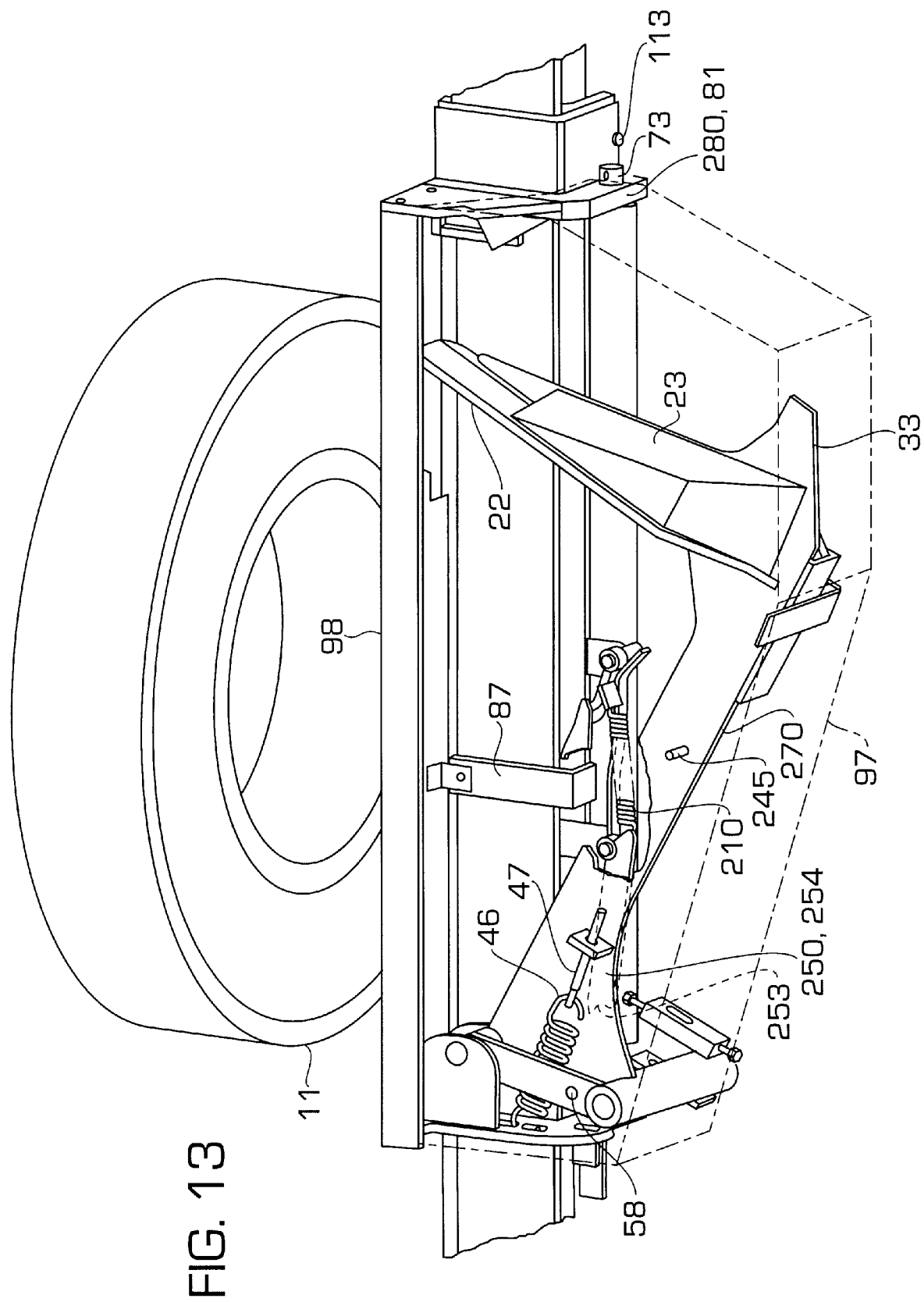
FIG. 13 is a perspective view of the second preferred embodiment, illustrating the chock arm in the retracted position.

As illustrated in FIG. 13, a spring 210 has one end hooked through the hole 254 on the lever assembly 250 and the other end hooked through the hole 209 on the latch assembly 200. The spring 210 urges the lever assembly 250 to rotate counter clockwise so that the cam surface 256 is held in contact with the cam lobe 205 of the latch assembly 200, and urges the latch assembly to rotate to the rest position shown on FIG. 13.

The hydraulic cylinder assembly 110 operates in the same manner as the first preferred embodiment. When hydraulic fluid is pumped in through the port 118, the pressure on the piston 117 causes the rod assembly 115 to extend, and when hydraulic fluid is pumped in through the port 119, the pressure on the rod side of the piston causes the rod assembly to retract. The rod assembly is anchored to the guide rail assembly 130 by a pin 114 through the hole in the end of the rod 116 (see FIG. 9).

The relationship of the components thus far discussed is illustrated in FIGS. 13, 14, 15 and 16. The carriage assembly 260 and the lock assembly 80 are mounted on the rail assembly 130, as illustrated in FIG. 13. The guide bar 271 of the carriage assembly 260 fits inside the tube 286 of the lock assembly 80 and the shaft 72 extends through the hole 82 in the plate 81. Thus, the carriage assembly 260 and the lock assembly 280 are provided with resistance against lateral motion by the rail assembly 130 and are provided resistance against twisting motion by engagement with each other. The lock assembly 80 has freedom of axial motion relative to carriage assembly 260 limited by the lock assembly 80 being trapped between the plate 261 of the carriage assembly and the collar 73.

The chock assembly 220 is mounted between the lugs 63 and 64 of the carriage assembly 260 and pivots on a pin 70. The sensing roller assembly 35 is attached to the chock assembly by the pin 40 as described in the first preferred embodiment.

The operation is similar to the first preferred embodiment except in the manner of controlling the motion of the chock assembly. As the cylinder 110 extends, the plate 81 of the lock assembly 280 contacts the collar 73 on the carriage assembly 260 and causes the carriage assembly to move forward, as shown in FIG. 13. As the carriage assembly continues to move forward away from the loading dock, the sensing roller 39 contacts the rear of the wheel 11.

Figure 14:
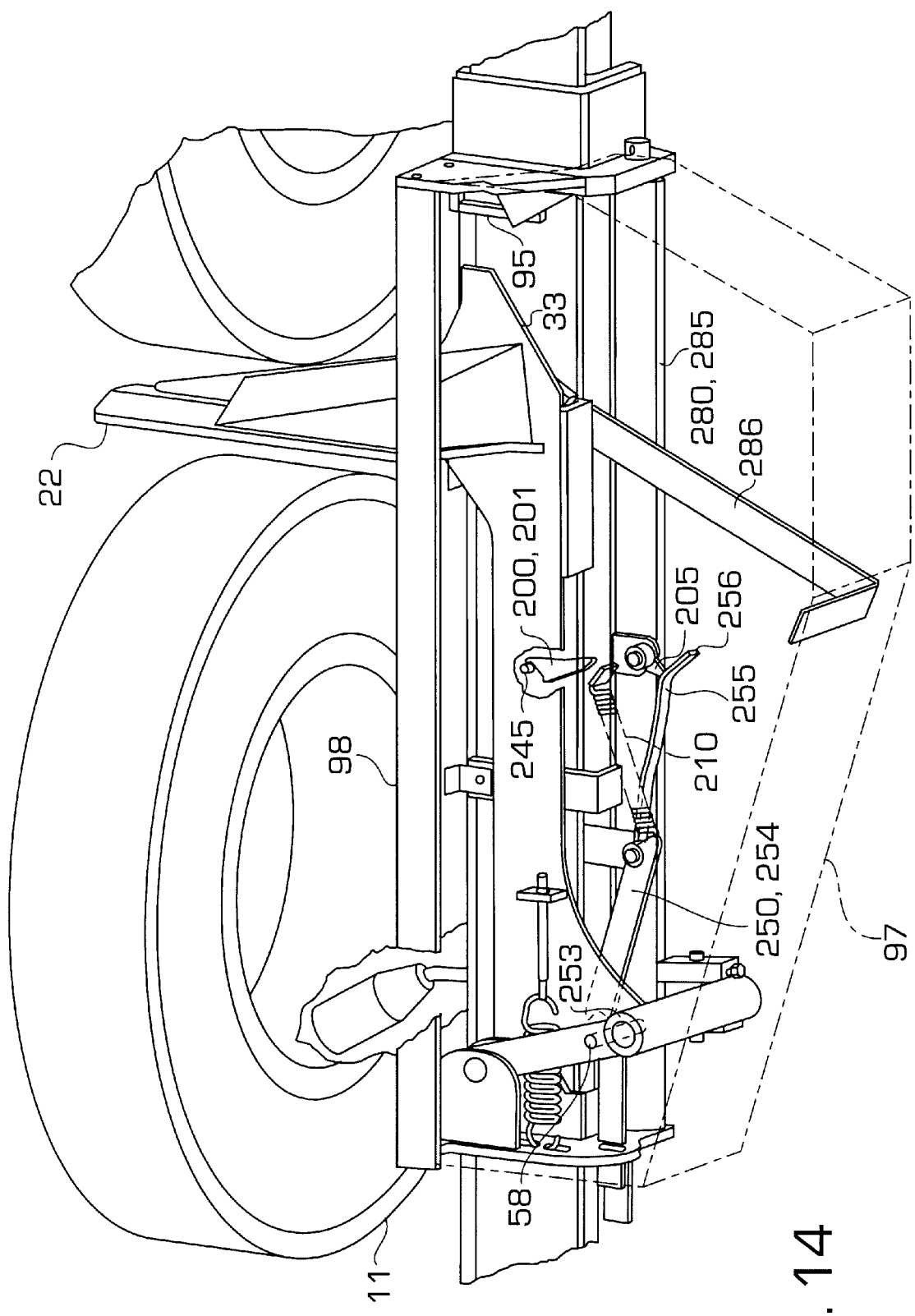
FIG. 14 is a perspective view, partially cut-away, of the second preferred embodiment of this invention illustrating the wheel chock in an engaging position.

As the cylinder 110 continues to extend, the horizontal force on the roller 39 causes the chock to extend in front of the outer rear wheel as illustrated in FIG. 14. The spring 46 acts on the chock assembly to urge it toward the retracted position. Thus the force on the sensing roller 39 must overcome the force of the spring 46 before the chock assembly will rotate to the extended position and the chock will not be extended prematurely by debris on the driveway.

As the chock arm assembly 220 rotates to the extended position the pin 245 on the bottom of the chock arm will contact the side of the latch plate 201 and cause the latch assembly 200 to rotate clockwise. As the pin 245 passes the latch surfaces 206, 207 and 208 the spring 245 will urge the latch assembly to rotate counter clockwise but it will be held in the extended position by the side of the latch surface 208 resting against the pin 245 as shown in FIG. 14. Thus the latch plate 201 will engage the pin 245 and hold the chock assembly 220 in the extended position. As the latch assembly rotates counter clockwise from the rest position, the cam lobe 205 will extend toward the cam surface 256 and cause the lever assembly 250 to rotate clockwise and move the concave surface 253 of the bar 251 out of the path of the pin 58.

As the cylinder 110 continues to extend, the sensing roller 39 is forced against the back of the wheel 11 and the carriage assembly 260 and lock assembly 280 will be prevented from moving farther away. Because the lock assembly cannot move farther out, the hydraulic pressure will increase and be sensed by an electrical pressure switch and the lock assembly 280 will then move rearward toward the dock. Even if the chock assembly is not in the fully extended position, any of the latch surfaces 206, 207 or 208 will hold the chock assembly in a position where the locking surface 95 of the lock assembly 280 will engage the locking surface 33 of the chock assembly 220 and the chock assembly will be locked in the extended position as shown on FIG. 15.

Figure 15:
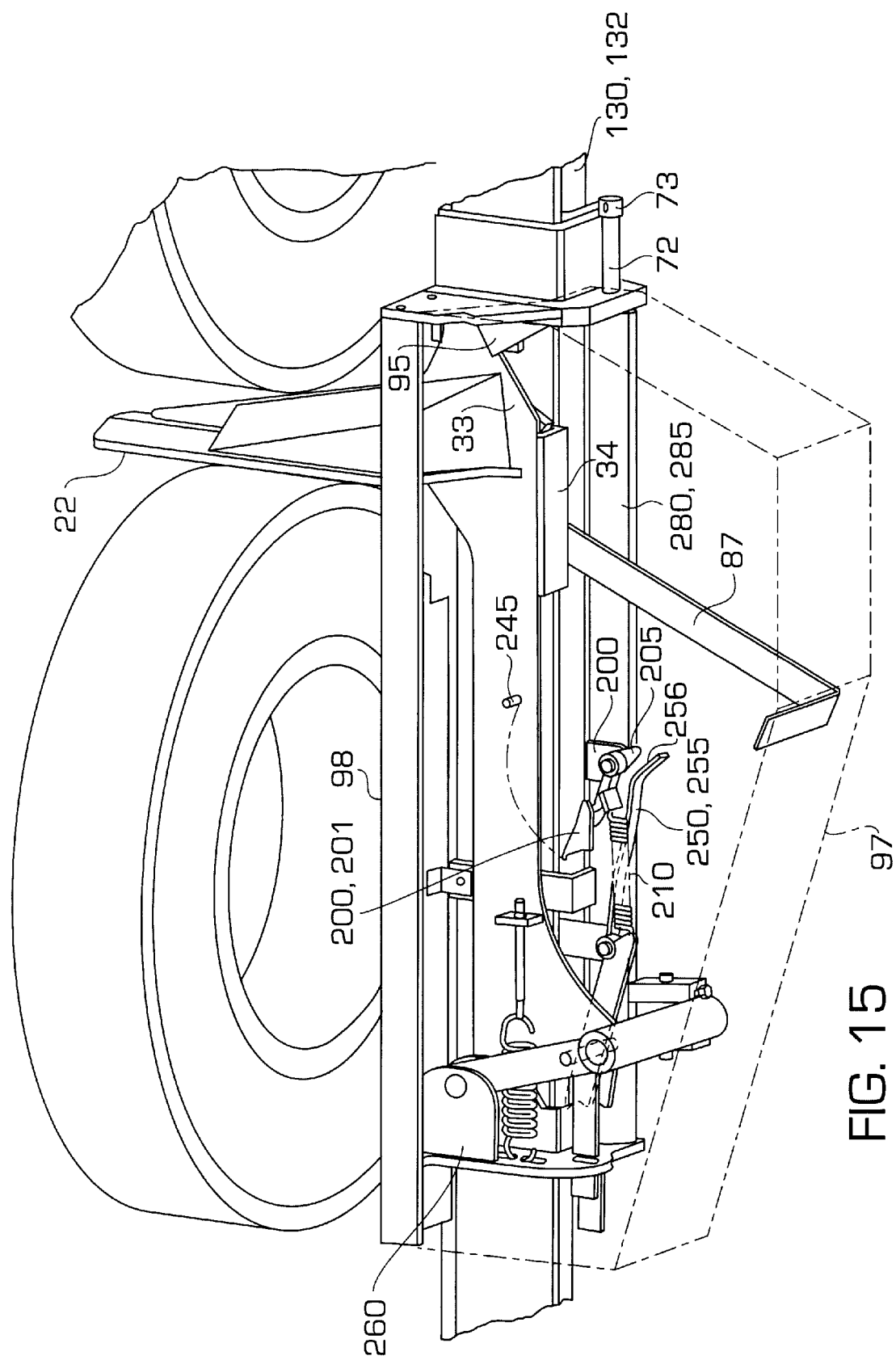
FIG. 15 is a perspective view, partially cut-away, of the preferred embodiment of this invention illustrating the wheel chock in an engaged and locked position.

FIG. 15 illustrates the chock engaging the front of the wheel 11. As the lock assembly 280 moves rearward towards the carriage assembly 260, the end of the bar 250 passes the pin 58. The latch assembly 200 is also moved rearward and the end of the latch plate 201 moved past the pin 245. The spring 210 then caused the latch assembly 200 to rotate counter clockwise to the initial position as shown. The spring 210 also caused the lever assembly 250 to rotate counter clockwise so that the concave end 253 of the bar 251 will be placed in a position to engage the pin 58 on the chock assembly.

Figure 16:
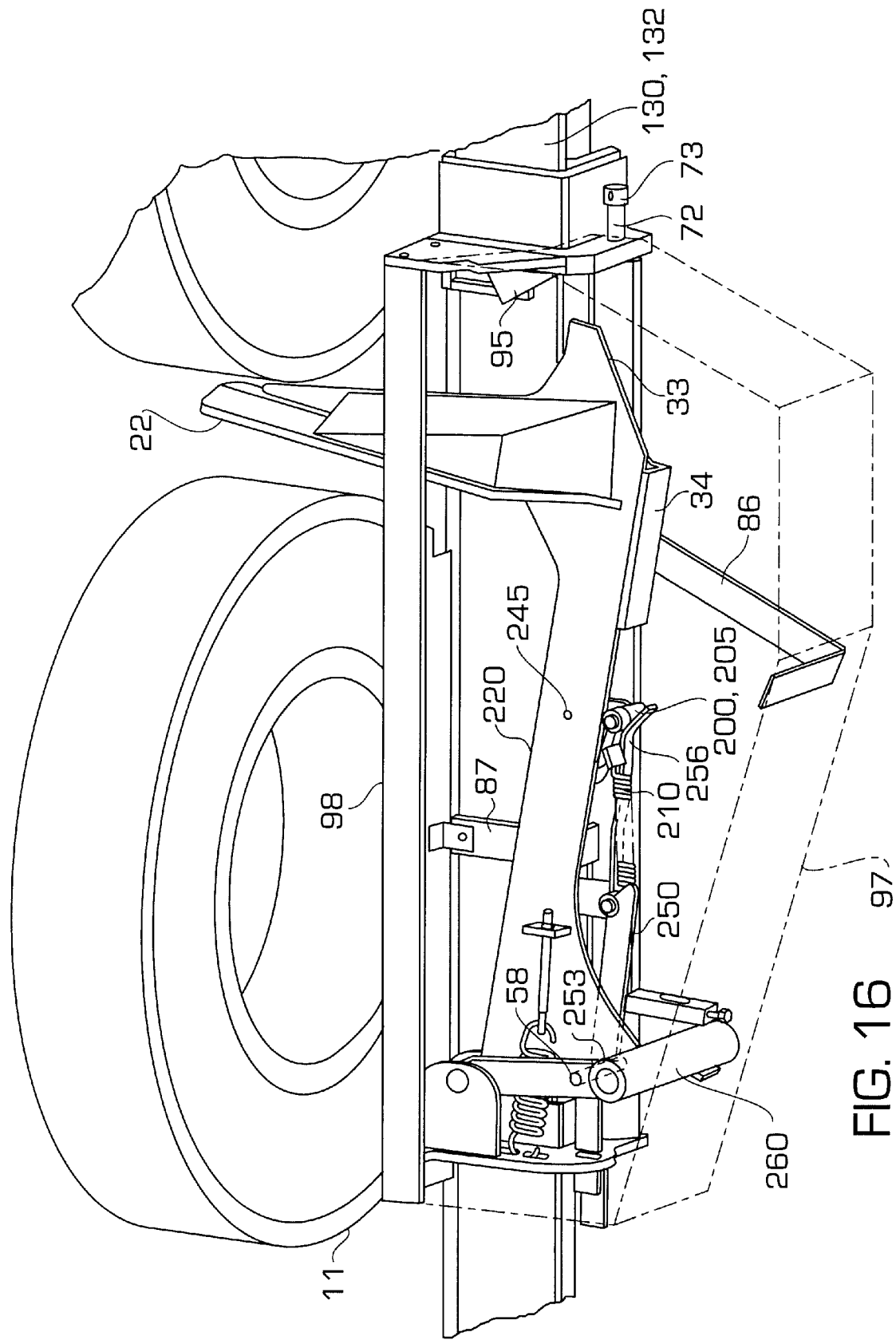
FIG. 16 is a perspective view, partially cut-away, of the preferred embodiment of this invention illustrating the chock arm retracting from the wheel.

When the loading operation is completed and the vehicle is to be released, the hydraulic cylinder 110 will extend. The lock assembly 280 will move the carriage assembly 260 forward until the sensing roller 39 again contacts the rear of the wheel 11 and the pressure switch will then cause a valve to shift. The lock assembly 80 will then move rearward toward the dock. The concave end 253 of the bar 251 will engage the pin 58 on the chock assembly, thereby preventing the lock assembly 80 from moving closer to the carriage assembly so that the locking surface 95 will not engage the locking surface 33 of the chock assembly. FIG. 16 illustrates the chock assembly as it has partially retracted, and the end of the bar 254 has engaged the pin 58 on the chock assembly 220. The spring 46 will urge the chock assembly 220 to rotate clockwise toward the retracted position as the lock assembly 80 forces the carriage assembly 260 to move along the rail toward the wall.

When the carriage assembly 60 has moved fully rearward along the rail, a limit switch 120 mounted at the end of the rail assembly 130 will sense the target plate 66 and cause the power unit to stop with the carriage assembly in the stored position. If the switch should malfunction, the pressure switch will sense the increase in hydraulic pressure and then cause the power unit to stop. A second switch 121 will sense the target bar 59 to indicate that the chock assembly 20 is rotated to the fully retracted position.

Modifications are within the scope of this invention. For example, while a hydraulic cylinder is shown, the chocking device of this invention could be powered by other means such as an electric motor driving a screw, or chain and sprockets. Also, there other possible configurations of the latch which controls the locking and release of the chock assemblies. This chocking device could be used alone, or in pairs to chock the wheels on both sides of the vehicle.

I claim:

1. A system for chocking a vehicle to prevent outward movement away from a structure comprising:

a horizontal guide rail positioned on the approach to said structure, a carriage assembly movable on said rail from a stored position to an operative position adjacent a tire of a vehicle to be restrained, a chock carried on said carriage assembly, said chock movable a substantially horizontal manner from a stored position that does not impede movement of a vehicle to be restrained to a vehicle engaging position where said chock is extended and blocks movement of said vehicle away from said structure, a retaining spring carried by said carriage assembly and operably coupled to said chock to said bias said chock in a stored position, a cam bar carried on said carriage assembly and operably connected to said retaining spring, a sensor projecting onto said approach and operably coupled to said chock, said sensor movable with said carriage assembly to engage the tire of said vehicle, wherein motion of said carriage assembly ceases when said sensor contacts said tire and said chock is extended to said vehicle engaging position when said sensor movement stops and the compressive force of said spring is overcome.

2. The system of claim 1 further comprising a lever assembly mounted on said carriage assembly, said lever assembly comprising a plate pivoted to said carriage assembly, and a pin mounted to said plate, said cam bar having a recess, wherein said recess of said cam bar engages said pin to hold said chock in said extended vehicle restraining position.

3. The system of claim 2 further comprising a lock assembly movable on said guide rail, said lock assembly engaging said chock when said chock is in said extended position to prevent movement of said chock to said stored position.

4. The system of claim 3 wherein said cam bar has one end fixed to said carriage assembly, said cam bar having a section engaging said pin to bias said spring in a direction that biases said chock to retract while said chock is held in said extended position by said lock assembly.

5. The system of claim 4 further comprising a plate assembly carried by said carriage, said plate assembly movable with said lever assembly, whereby said pin is repositioned by engage said cam bar at a position displaced from said recess.

6. The system of claim 3 further comprising means to move said carriage assembly and said lock assembly on said rail.

7. A system for chocking a vehicle to prevent outward movement away from a structure comprising:

a horizontal guide rail positioned on an approach to said structure, a carriage assembly on said rail from a stored position to an operative position adjacent a tire of a vehicle to be restrained, a chock carried on said carriage assembly, said chock movable in a substantially horizontal manner from a stored position that does not impede movement of a vehicle to be restrained to a vehicle engaging position where said chock is extended and blocks movement of said vehicle away from said structure, a sensor projecting onto said approach and movable with said carriage assembly, said sensor positioned to determine the presence of a tire to be chocked, and an adjustable mounting for said sensor on said carriage assembly, said mounting varying the position of said sensor relative to said chock.

8. The system of claim 7 wherein said sensor comprises a roller and a lever arm coupling said roller to said carriage assembly.

9. The system of claim 8 wherein said adjustable mounting comprises a mounting plate having an elongated slot, a pin coupled to said lever arm and extending through said slot and, an adjustment mechanism to position said pin in said slot.

10. The system of claim 10 wherein said adjustment mechanism comprises a pair of adjustable bolts at ends of said slot to engage and fix the position of said pin at varying positions within said slot.

11. The system of claim 7 further comprising means operably coupling said sensor to said chock, wherein said sensor extends said chock by as said carriage assembly continues outward movement after said sensor has engaged a tire.

12. A system for chocking a vehicle to prevent outward movement away from a structure comprising:

a horizontal guide rail positioned on an approach to said structure, a carriage assembly movable on said rail from a stored position to an operative position adjacent a tire of a vehicle to be restrained, a chock carried on said carriage assembly, said chock movable on a substantially horizontal manner from a stored position that does not impede movement of a vehicle to be restrained to an extended vehicle engaging position where said chock is extended and blocks movement of said vehicle away from said structure, a latch assembly carried by said carriage assembly, a lever assembly on said carriage assembly and pivotally thereto, a spring coupling said lever assembly to said latch assembly, a sensor projecting onto said approach and operably coupled to chock, said sensor movable with said carriage assembly to engage the tire, wherein motion of said carriage assembly ceases said sensor contacts said tire and when said chock is extended to said vehicle engaging position when said sensor movement stops and the lever assembly is latched to hold said chock in said extended position.

13. The system of claim 12 wherein said chock further comprises an arm and a chock plate coupled to said arm, said arm engaging said latch assembly as said chock moves into said extended position so that said latch assembly holds said chock in said extended position.

14. The system of claim 12 further comprising a lock mechanism movable on said rail, said lock mechanism engaging said chock and holding it in an outward restraining position.

15. The system of claim 12 wherein said lever assembly comprises a bar pivotally coupled to said carriage assembly at one end thereof and a lever having a cam surface at an opposite end, said latch assembly having a cam lobe, and said spring maintaining said cam surface of said lever assembly in contact with said cam lobe.

16. The system of claim 12 further comprising a pin carried by said chock, said latch assembly movable to engage said pin and hold said chock in an extended position.

17. The system of claim 12 further comprising an adjustable mounting for said sensor on said carriage assembly for varying the position of said sensor relative to said chock.

18. The system of claim 17 wherein said adjustable mounting comprises a mounting plate having an elongated slot, a pin coupled to said lever arm and extending through said slot and, an adjustment mechanism to position said pin in said slot.

19. The system of claim 18 wherein said adjustment mechanism comprises a pair of adjustable bolts at ends of said slot to engage and fix the position of said pin at varying positions within said slot.

20. The system of claim 18 further comprising means operably coupling said sensor to said chock, wherein said sensor extends said chock by as said carriage assembly continues outward movement after said sensor has engaged the tire.

21. The system of claim 12 wherein said sensor comprises a roller and a lever arm coupling said roller to said carriage assembly.

* * * * *